United States Patent [19]
Warn et al.

[11] Patent Number: 5,831,861
[45] Date of Patent: *Nov. 3, 1998

[54] POINT-OF-SALES INTERFACE FOR MECHANICAL PUMPS

[75] Inventors: Walter E. Warn, Knightdale; Fred K. Carr, Chapel Hill, both of N.C.

[73] Assignee: Progressive International Electronics, Raliegh, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 679,303

[22] Filed: Jul. 12, 1996

[51] Int. Cl.⁶ .................................................. G06F 17/60
[52] U.S. Cl. ................ 364/479.01; 222/52; 364/130; 364/400; 364/479.07; 364/479.11; 705/1; 705/16; 705/413
[58] Field of Search ................................ 222/14, 26, 27, 222/28, 32, 36, 52; 364/130, 131, 132, 464.23, 479.01, 479.02, 479.07, 479.1, 479.11, 509, 510, 400; 377/21; 395/201, 216, 222, 228, 200.31, 200.33; 705/1, 16, 22, 28, 413

[56] References Cited

U.S. PATENT DOCUMENTS

| | | | |
|---|---|---|---|
| 3,894,658 | 7/1975 | Buell, Jr. ................................ | 222/26 |
| 3,984,032 | 10/1976 | Hyde et al. ............................. | 222/26 |
| 4,067,486 | 1/1978 | Hyde et al. ............................. | 222/26 |
| 4,247,899 | 1/1981 | Shiller et al. ........................... | 705/413 |
| 4,550,859 | 11/1985 | Dow, Jr. et al. ......................... | 222/26 |
| 5,270,943 | 12/1993 | Warn ................................... | 364/479.11 |
| 5,299,135 | 3/1994 | Lieto et al. ............................ | 364/479.11 |
| 5,361,216 | 11/1994 | Warn et al. ............................ | 364/510 |
| 5,394,336 | 2/1995 | Warn et al. ............................ | 364/479.06 |
| 5,659,482 | 8/1997 | Warn et al. ............................ | 364/479.02 |
| 5,663,887 | 9/1997 | Warn et al. ............................ | 364/479.02 |
| 5,694,326 | 12/1997 | Warn et al. ............................ | 364/479.01 |

*Primary Examiner*—Edward R. Cosimano
*Attorney, Agent, or Firm*—Fred K. Carr

[57] ABSTRACT

A mechanical fuel pump control system for controlling mechanical fuel pumps through a PC-based Point-of-Sales system utilizing a mechanical pump controller and a mechanical pump configurator is disclosed. The pump control system includes a pump control circuit board having a microprocessor with read-only-memory for storing operating code and a read-and-write-memory device for calculating and storing response data. The pump control system uses a configuration circuit board to condition output signals including preset limits, pump authorization signal and close valve signal, and to condition input signals including a pulse signal, a handle signal, and a motor return signal. A relay board controls the pumping process. The pump control system allows the POS application software to integrate pump control with other functions including register function, scanning, and inventory control in the POS computer. A feature of the present invention is that it allows the same POS system to control electronic and mechanical pumps through appropriate configurators.

7 Claims, 3 Drawing Sheets

FIG._1

POINT-OF-SALES INTERFACE FOR MECHANICAL PUMPS

FIELD OF THE INVENTION

The present invention relates to a device and method for controlling mechanical fuel pumps, and more particularly, to a fuel pump control system which acts as an interface between a PC-based point-of-sales register system and mechanical fuel pumps where the control system uses a configurator and relay board to control the mechanical fuel pumps.

BACKGROUND OF THE INVENTION

Fuel dispensers are widely used at petroleum retail outlets, car washes, fleet fueling sites, and related, to dispense motor fuel. Fuel dispensers generally include a pump, a flow meter, a flow quantity signal generator (pulser), and a flow indicator. The pump has a pipe connection on one side to a fuel supply tank and is connected on the other side to a hose with a fuel supply nozzle. The flow meter measures the quantity of fuel being pumped, and the pulser generates a flow quantity signal for indicating the amount of fuel dispensed and calculating the dollar value of the fuel dispensed. Older fuel pumps are generally referred to as "mechanical pumps" since they use a conical gearing arrangement in the pump head to set the price of the fuel, measure the amount of fuel dispensed, and calculate the value of the fuel dispensed. The gearing arrangement turns numbered round wheels which display the volume and dollar amount of the fuel dispensed. When the mechanical pumps are controlled by a remote controller, they use a penny pulser to indicate to the remote controller the dollar value of the fuel dispensed. By this method, an attendant in the site building can monitor and control the fueling process from inside.

Newer fuel pumps have a microprocessor (MP) in the dispenser head for setting the price, calculating the value of fuel dispensed, and displaying the amount and value of fuel dispensed. These dispensers are generally referred to as "electronic dispensers" or sometimes "smart pumps". The electronic dispensers communicate with remote controllers through the MP.

Remote dispenser controllers are widely used to monitor and control the dispensing process. The controller is electrically connected to the dispensers for sending and receiving data signals. In general, the dispenser controller is a MP with read-only-memory (ROM), read-and-write memory (RAM), and input/output ports for reading and storing information. The controller sends data signals to the dispensers, and the dispensers send data signals to the controller. Data signals sent to the dispenser from the controller include preset limits of fuel to be pumped at corresponding pumps and pump authorization. Data signals sent from the pumps to the controller include pump identity (pump number), pump status, and dispensed fuel value.

There are two types of remote dispenser controllers presently used in the industry. The first type is a control console which is a separate device from the cash register. The console has a number of push buttons for controlling the dispensing process and a visual display for indicating the volume and dollar value of the fuel dispensed during a transaction. The console is a separate device from the cash register, therefore, the attendant must key into the cash register sales information taken from the console. The other more recently developed system is an interface which connects the dispensers to a Point-of-Sales (POS) computer system such that the pumps are monitored and controlled through the POS. The dispensers are controlled from keys on the POS transaction board, and information on each transaction is passed directly into the POS. Through application software programs, the POS can control pumps, read bar codes, compile inventory reports, and perform other related task.

With electronic dispensers, the MP in the controller communicates with the MP in the dispenser. With mechanical pumps, there is no MP in the pump head, therefore, control must be though the conical gearing arrangement. The present invention relates to a specialized mechanical pump configurator which uses a relay board to control mechanical pumps. A feature of the present invention is that it allows one to control both electronic and mechanical pumps with the same POS system.

There are several commercial brands of electronic dispensers used in the petroleum retail industry. Each dispenser brand has its own proprietary communication protocol for communication between the dispenser and controller. Certain dispensers use current loop communication, others use voltage level communication. U.S. Pat. No. 5,270,943 entitled FUEL PUMP CONTROL SYSTEM, having common inventor and assignee, relates to fuel pump control system which controls electronic fuel dispensers through a PC-based POS system. A feature of that disclosure is that the controller uses a configurator means to configure the communication protocols so that it can be used to control different brands of electronic dispensers, however, the disclosure does not relate to controlling mechanical pumps.

U.S. Pat. No. 5,394,336 entitled FUEL DISPENSER-CASH REGISTER CONTROL CONSOLE, having common inventors and assignee, relates to a fuel dispenser cash register control console which simultaneously controls fuel dispensers and the input key switches on a cash register so sales information can be down-loaded to the register when the sale is paid out on the console. The console, likewise, uses a configuration means to configure the communication protocol for different electronic dispensers. The disclosure does not include a configurator for controlling mechanical pumps.

The present invention provides a new approach for controlling mechanical fuel pumps through a PC-based POS systems. The present invention includes a mechanical pump configurator which configure the digital signals from the MP in the pump control system into conditioned electrical signals for opening and closing relays to control the pumps. The configurator communicates with the pumps through a relay board; signals sent to the pumps from the pump control system include preset amounts of fuel to be dispensed, an authorization signal and a close valve signal; signals sent from the pumps to the pump control system include a handle signal, a pulse signal, and a motor return signal.

U.S. Pat. No. 4,247,899 issued to Schiller et. al relates to a control system for controlling mechanical pumps. The Schiller disclosure comprises a master pump control and information storage module with master and display processors and a display console with a plurality of LED indicators, a two-digit identification register and a six digit cost/volume register. A keyboard is connected to the display processor and to the master processor. In addition, a slave pump control and information storage module is used to control each pump being controlled. Each slave module has a slave processor with RAM for storage of information. The master processor addresses each slave processor. In essence, the Schiller disclosure is a control console with a master processor connected to slave processors for controlling individual pumps.

U.S. Pat. No. 4,550,859 issued to Dow et. al relates to microprocessor controlled fluid dispensing system. A MP is connected to a remote console, to individual pump controllers, sensors and the like for monitoring fluid flow. With the Dow disclosure, a pump interface circuit is installed in each pump for controlling pump function.

The present disclosure relates to a mechanical fuel pump control system for controlling mechanical fuel pumps through a PC-based POS terminal utilizing a mechanical pump configurator and relay board. The present invention improves on the Schiller and Dow disclosures by using a single MP to control up to sixteen pumps through a configurator which configure the logic signals into electrical signals for controlling pump operation, and further, the present disclosure discloses a pump controller for interfacing mechanical pumps to a POS computer such that the mechanical pumps are controlled through the POS system. The present invention allows one to control both mechanical pumps and electronic dispensers through the same POS system by using the appropriate configurators.

SUMMARY OF THE INVENTION

In summary, the present invention relates to a mechanical fuel pump control system for controlling mechanical fuel pumps through a PC-based POS terminal utilizing a mechanical pump configurator. The pump control system includes a pump control circuit board having a MP with read-only-memory for storing a series of commands to control the pumps during the dispensing process and read-and-write-memory for calculating and storing response data. The pump control system uses a configuration circuit board to condition output signals including preset limits, an authorize signal and a valve signal, and to condition input signals including a pulse signal, handle signal, and a motor return signal. A relay board controls the pumping process. The flow of data between the MP in the pump controller and the MP in the PC-based POS is controlled by a driver. The pump control system allows the application software in the POS to integrate pump control with other functions including cash register, scanning, inventory control reports, and related. A feature of the present invention is that it allows the same POS system to control both mechanical pumps and electronic dispensers by using the appropriate configurators.

Accordingly, the primary object of this invention is to provide a fuel pump control system for controlling mechanical fuel pumps through a PC-based POS system.

A further object of this invention is to provide a mechanical fuel pump control system which includes a configuration circuit for conditioning signals to the pumps and responses from the pumps.

A further object of the present invention is to provide a fuel pump control system which can be used with both electronic dispensers and mechanical pumps.

A further object of the present invention is to provide a fuel pump control system which can control mechanical pumps and electronic dispensers from different manufacturers.

BRIEF DESCRIPTION OF THE DRAWINGS

Other objects of this invention will appear in the following specification and claims, reference being made to the accompanying drawings which form a part thereof.

DETAILED DESCRIPTION OF THE INVENTION

Figure 1:
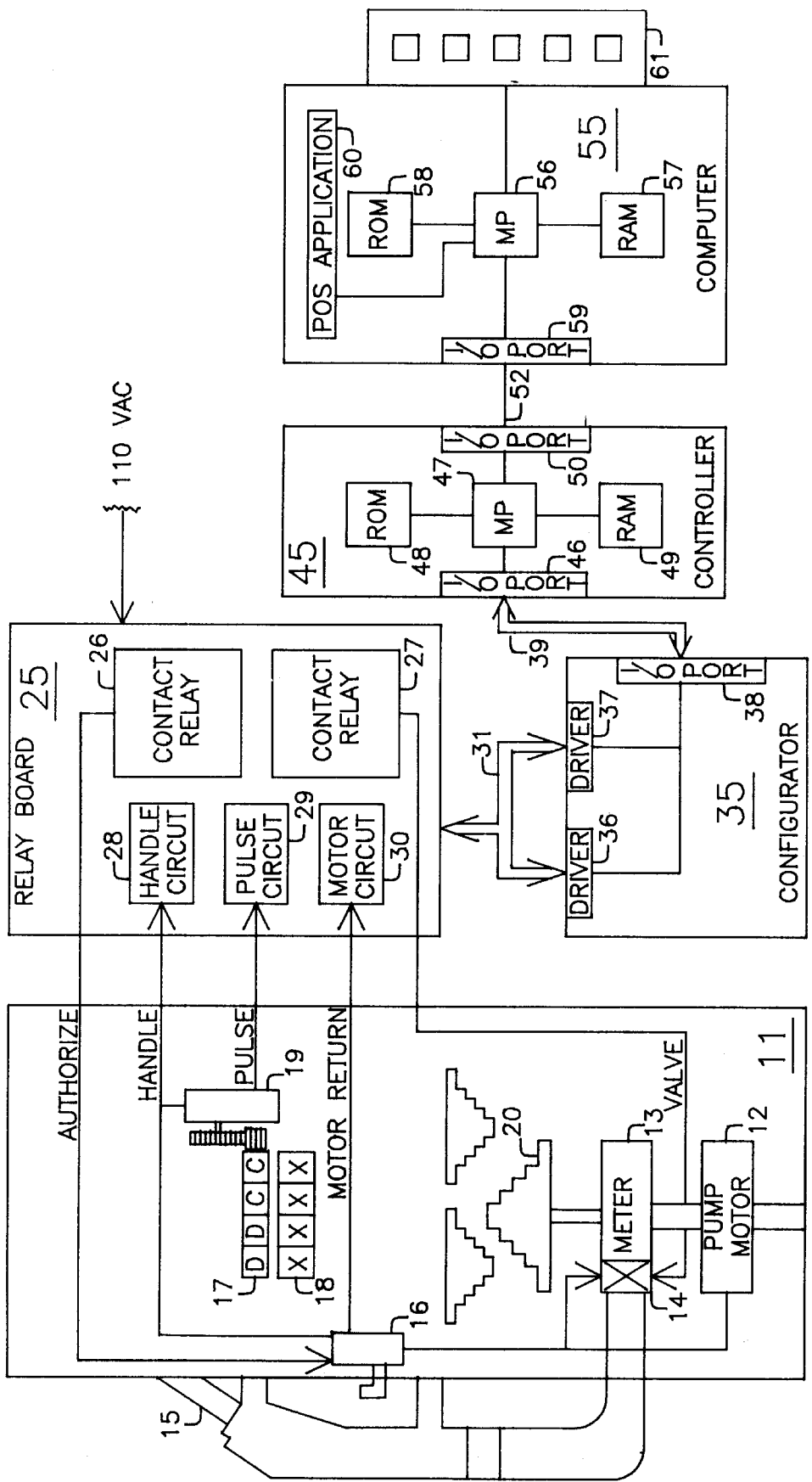
FIG. 1 is a schematic diagram of a fuel dispensing system including a mechanical fuel pump, a relay board, a mechanical configurator, a pump controller, and a POS computer.

Referring now to the drawings, and first to FIG. 1, there is shown a schematic overview of a fuel delivery system, generally designated (10). There is shown a mechanical fuel pump (11) electrically connected to a POS computer (55) through a relay board (25), a mechanical pump configurator (35), and a mechanical pump controller (45). The POS system (55) controls the dispensing process at the fuel pump (11) through the pump controller (45) which transfers data signals to and receives responses from the pump through data wires. In the example, one fuel pump is used; however, in the industry it is common for a fueling facility to have several fuel pumps for dispensing different product types. The one pump is used only for illustration.

As previously discussed, mechanical fuel pumps do not have a MP in the pump head for controlling the dispensing process and displaying the amount of fuel dispensed as do electronic or "smart pumps" Mechanical pumps use a conical gearing arrangement to perform these functions. The fuel is pumped from a storage tank (not shown) by a pump motor (12) through a flow meter (13) with valve (14) to the nozzle (15). When the nozzle (15) is open, fuel flows from the storage tank into the fuel tank of a vehicle. As fuel flows through the meter (13), it turns a cone gear (20) which calculates the volume and dollar value of fuel dispensed. The gearing arrangement turns a round number wheel which displays volume in display (18) and another numbered wheel which displays dollar value dispensed in display (17). A fueling transaction is started by a customer removing the nozzle (15) from the pump and turning the nozzle handle which activates the reset mechanism (16). In a stand alone operating mode, the reset mechanism causes the displays (17,18) to reset to zero, it starts the pump motor (12), opens valve (14), allowing fuel to flow when the nozzle is opened. When the fuel pump is under the control of a remote controller, it must first be authorized before it will dispense fuel. In this mode, the reset mechanism sends a handle signal (indicating an authorization request) to a controller. If the pump is authorized at the remote controller, the motor (12) starts and a motor return signal indicating this is sent to the controller (45). As fuel is dispensed, a penny pulser (19) coupled to the dollar display (17) sends to the controller a pulse signal. As later discussed, the remote controller sends a signal to close the large valve (14) in preset sales when the sale is about fifteen cents from completion causing the flow to slow down for the last few pennies. The pump with motor (12), flow meter (13), valve (14), nozzle (15), conical gears (20), reset mechanism (16), dollar display (17), volume display (18), and pulser (19) constitute a mechanical pump means.

As further seen from FIG. 1, there are three input signals from the fuel pump (11) to the relay board (25) and thus to the pump controller (45) through the configurator (35) including a pulse signal, a handle signal and a motor return signal. There are two output signals from the controller (45) through the relay board (25) to the fuel pump (11) including an authorize signal and a valve signal. The relay board (25) includes a contact relay (26) for processing the authorize signal and a second contact relay (27) for processing the valve signal. The input (handle, pulse, motor return) signals can be processed through contact relays or through electronic circuits (28,29,30) as later discussed. In general, the following sequence of events occur. The customer turns the reset mechanism (16) which causes a handle signal to be sent to the relay board (25). This signal is sent to the POS computer (55) through configurator (35) and the pump controller (45). An authorization command, which is initiated by the computer (55), is sent from the pump controller (45) to the relay board (25) causing the relay (26) to close. This sends 110 VAC to the reset mechanism (16) which starts the pump motor (12). A motor return signal is sent back to the relay board (25) indicating that the motor is running. In preset transactions, the valve relay (27) causes the valve (14) to close causing the last few pennies to be delivered at a slower flow. No motor return signal back to the relay board (25) indicates to the controller that the customer has completed the fueling process and replaced the nozzle. The motor return signal from the pump to the relay board is 110 volts. The processing circuit (30) reduces this to 12 volts which is sent to the configurator for conditioning. The pulse processing circuit (29) includes a de-bouncer circuit. The authorize relay (26), the valve relay (27), the handle signal circuit (28), the pulse signal circuit (29), and the motor return circuit (30) constitute a relay board means.

The configurator (35) has a bus connection (31) to the relay board (25) and a bus connection (39) to the pump controller (45). The configurator has an output driver (36) for conditioning the authorize and valve signals, and an input signal conditioning circuit (37) for the pulse, handle, and motor return signals. Connection to the controller (45) is through I/O bus circuit (38) for transmitting data, addresses, and control signals.

As previously discussed, the pump control board (35) sends commands (authorize, open/close valve, and preset limits) to the pump (11), and the pump sends responses to the pump controller (35) including pump number, pump status, and dispensed fuel value. As later discussed, the pump controller uses a series of nine communication commands to control the pump and keep up with amounts of fuel dispensed. The commands are initiated through a key on the POS transaction board (61). The commands are stored in ROM (48), and the data is processed and stored in RAM (49). The controller (45) has a serial connection (52) to the POS computer (55) through I/O port (50) and I/O port (59).

PC-based POS systems are now widely used in the retail petroleum industry since these system allows integration of pump control, cash register function, credit card authorization, scanning inventory control, and management reports in the same system. These task are performed by auxiliary software application programs (60). Such system is available from Applied Business Systems in Norcross Ga., and is not discussed in detail. The MP (56), ROM (58), RAM (57), POS application program (60), and transaction keyboard (61) constitute a POS computer means.

In the illustration, the pump control board (45) has a serial connection to the MP (56) in the POS computer (55). The system can be designed such that the pump control board is a daughter board which is plugged into the main (mother) PC board through a PC bus connection. Reference is made to U.S. Pat. No. 5,270,943 having a common inventor and assignee which is incorporated as a reference. In this specification, PC is generally defined as a self-contained computing unit which may be used in a stand alone mode or in a network of computing units.

Figure 2:
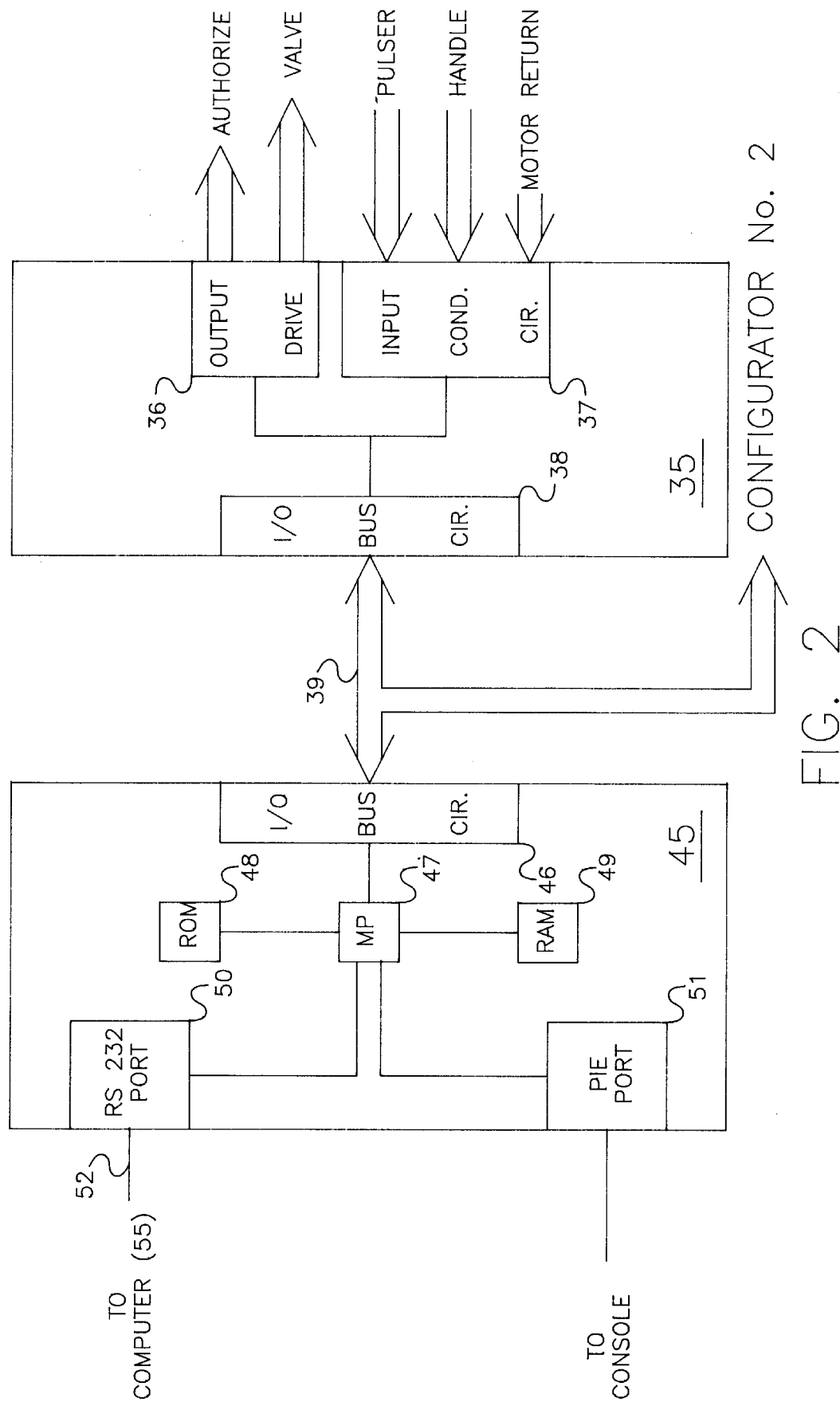
FIG. 2 is a block diagram showing the functional components of the pump controller and the mechanical pump configurator.

Referring now to FIG. 2, there is shown a schematic block diagram of the pump control system (45) and the mechanical pump configurator (35). The pump control board (45) includes a printed circuit board with a MP (47), Intel 8032 being an example, a read-only-memory chip, ROM (48), for storing the pump control commands, and a read-and-write memory chip, RAM (49), for calculating and storing variables as prices to be charged at the pumps, totals dispensed by the pumps, and responses data from the pumps during the dispensing process. These chips have conventional bus connections with the MP (47). The pump controller (45) has a serial connection (52) to the POS computer (55) through a RS232 I/O port (50). There is another I/O port (51) for connecting to other peripheral devices including a previously disclosed console as later discussed. In addition, a computer can be connected to the port for analyzing the data stream between the controller (45) and the POS computer (55). The controller is powered by a wall transformer and has a baud chip for communication, not shown. The controller is connected to the configurator (35) through a bus connection (39) for transferring data, addresses, and control signals. These signals are conditioned by an I/O bus circuit (46). The MP (47), ROM (48), RAM (49), RS232 I/O port (50), and the I/O bus circuit (39) constitute a pump control means.

A feature of the pump controller (45) is that it can use a common command structure to control several electronic dispenser brands, each having its own unique communication protocol, and mechanical pumps. This is accomplished by using configuration circuits, where the configurators for controlling electronic dispensers were disclosed in U.S. Pat. Nos. 5,270,943, 5,557,529, and 5,694,326, having common inventors and being incorporated as references. Referring further to FIG. 2, there is shown a block diagram for the mechanical pump configurator. The configurator circuit (35) is connected to the pump controller (45) through I/O bus connector (38). The configurator (35) has an output driver (36) for conditioning the authorize and valve signal which originates in the pump controller (45) for transfer to the relay board (25). It also has an input conditioning circuit (37) for conditioning the pulser, handle, and motor return signals which originate in the pump (11) for transfer to the pump controller (45). In essence, the conditioning circuits configure the digital signals from the MP (47) in the controller (45) into an electrical form readable by the relay board and the electrical signals from the relay board (25)into a digital form readable by the MP in the controller. In field units, each configurator board can control up to eight pumps. If there are more than eight pumps at the fueling site, a second configurator can be connected through a Y-connector. The input-output bus circuit (38), the output driver (36), and the input conditioner circuit (37) constitute a mechanical pump configurator means. The configurator can be powered from the relay board or from a wall transformer.

Having discussed the hardware components of the present disclosure, following is an illustration of the protocol used for communication between the POS computer (55) and the pump controller (45). Nine commands are used to control the dispensers during the fueling process. The commands are stored in the ROM (47), and include pump authorization, sale information, pump stop, pump resume, error, status request, reset, polled totals, and price per unit. Commands are initiated from the input keys on the transaction board (61) of the POS (55). Reference has been made to the fact that the same command structure can be used to control electronic dispensers and mechanical pumps. With mechanical pumps, totals are not kept in the pump but a running total is kept in the pump controller (45). Also with mechanical pumps, prices are sent to the pump controller (45) for calculations, but prices must also be set manually in cone gears in the pump head.

Each command and response data is transferred in a formatted frame according to following Protocol Command Format:

STX CMD [Pump] [Hose] [ . . . Data . . . ] ETX CD
STX=ASCII 02/16
CMD=command code (one character)
Pump=fueling positions (two characters)
Hose=grade number (one Character)
Data=programming data or action
ETX=ASCII 03/16
CD=check digit The check digit is constructed by adding all of the characters of the string, starting with the STX and ending with the ETX, then subtracting the value from "00" and sending the result. The check digit is masked off to seven bits.

The AUTHORIZATION COMMAND is used to initiate a fueling operation. A limit of fuel to be dispensed can be set to a dollar or volume amount, or no limit (Fill-Up). If a Fill-Up is requested, the dollar and volume fields are ignored. All decimal points are implied but not sent.

Command Format:
STX A Pump# Hose# Flag $$$$.$$ VVV.VVV ETX CD
A=command code
Pump#=fueling position (2 characters)
Hose#=Hose number (1 character)
$$$$.$$=dollar limit amount (2 decimals points)
VVV.VVV=volume limit amount (3 decimal points)

Flag options:
'0'=Dollar limit (credit price)
'1'=Dollar limit (cash price)
'2'=Volume Limit (credit price)
'3'=Volume Limit (cash price)
'4'=Fill-Up (no limit)

Response:
ACK/NAK only

To deauthorize a pump, the stop and resume commands are used. The stop command is sent. The resume command is sent only after a stop status is indicated for the fueling position.

The SALE INFORMATION COMMAND is used to read the sale information or clear the sale ready flag. This command can be used at any time during a sale in progress, all fields known will be filled in. The information in this response (once the sale is complete) is what actually took place at the fueling position. The 'R' flag indicates a "read sale" operation and the 'C' flag indicates a clear sale ready operation.

Command format:
STX B Pump# Flag ETX CD
B=command code
Pump#=fueling position (2 characters)
Flag=type of operation (1 Character)

Flag operation:
R=read sale information
C=clear sale ready status
E=extended sale information Extended Sale Command Format:
STX B Pump# E Tag(s) ETX CD
H=Hose #
M=MOP (method of payment) of Sale
$=Dollar of Sale
V=Volume of Sale
P=Unit price of sale
S=Current Pump Status
T=Pump polled Totals
Volume—000000.000
Cash—0000000.00

Response:
Read operation:
STX Pump# Hose# Flag $$$$.$$ VVV.VVV ETX CD
Pump#=fueling position (2 characters)
Hose#=hose number (1 character)
Flag=type of sale (1 character)
$$$$.$$=dollar amount (2 decimal places)
VVV.VVV=volume amount (3 decimal places)

Flag indicator:
'0'=credit sale
'1'=cash sale

Clear Operation
ACK/NAK only

The STOP COMMAND is used to stop one or all fueling positions. Once this command is issued, a resume command must be issued to clear the stopped status.

Command format:
STX C Pump# ETX
C=command code
Pump#=fueling position (2 characters)

Response:
ACK/NAK only

The RESUME COMMAND is used to resume one or all fueling positions. This command is used in response to a Stop Command.

Command format:
STX D Pump# ETX
D=command code
Pump#=fueling position (2 characters)

Response:
ACK/NAK only

The ERROR COMMAND is used to read the error queued. These errors may be related to the pumps or to the system. Each error includes the pump number (00=system error) and an error code. The procedure is to read the error and then clear it. If the "Error Queued" status bit is still set, another error is queued.

Command format:
STX E Flag ETX CD
E=command code
Flag=operation type

Flag operation:
R=read the error
w=clear the top error
C=flush the error queue
E=extended error read Response:
Clear/flush operation: ACK/NAK only
Read operation:
STX Pump# EC ETX CD
pump#=fueling position (00=system)
EC=error type (two characters)

Extended Read Operation
STX Pump# EC EX ETX CD
Pump#=pump number
EC=error type
EX=extended error code Error codes include:
System codes:

01=check sum of PROM failed
02=byte test of RAM failed
03=reserved
04=all pump communication down
05=invalid command received
06=authorization failed
07–9=reserved
10=system reset
Pump codes:
01=unit price on pump incorrect
02=pump did not stop at preset amount
03=invalid data from pump
04=communication down for pump
05=invalid pump status
06=reserved
07=pump authorized by itself The STATUS REQUEST COMMAND is used to read the status of each pump. The status indications are "bit" oriented. The first status in the response is the systems status, the remainder of the statuses are for the fueling positions. Each status consists of two ASCII characters. The lower nibble (4 bits) of the character are the status bits. The upper nibble is always a '3' (0011 binary). There are two types of status requests. The first status request is without the option 'E' flag. This status maintains downward compatibility and returns the status for the first 16 fueling positions. The "E" option returns a status for each pump (32 fueling positions). The "Extended status" is the preferred command and returns additional information.
Command format:
STX F [E] ETX CD
Response:
STX Ss Pp Pp . . . Pp ETX CD
System status:
S=Bit 3=reserved Bit 2=reserved Bit 1=reserved Bit 0=communication down for all pumps
s=Bit 3=error in error queue Bit 2=controller has completed reset Bit 1=reserved Bit 0=emergency stop sent to pumps
Pump status
P=Bit 3=pump has been sent stop Bit 2=drive away; amount has not increased in 7 seconds Bit 1=pump is dispensing fuel Bit 0=sale is complete
p=Bit 3=controller allowed to authorize Bit 2=authorization sent to pump Bit 1=pump communication established Bit 0=pump handle is lifted, request service The RESET COMMAND is used to reset the controller. The result of this command is all data and configuration is reset and the 'Controller Reset' status bit (bit 2 of system status two) is set. The controlling program must configure the controller before any operations can be performed.
Command format:
STX G ETX CD
Response:
ACK/NAK only The PUMP TOTALS COMMAND is used to read the totals from the requested fueling position and hose number. It is noted that some dispensers can return volume, cash and credit totals and others can return only volume and money totals.
Command format:
STX I Pump# Hose# ETX CD
Pump#=fueling position (2 characters)
Hose#=hose number (1 character)
Response:
STX Pump# Hose# VVVVVVV.VV XXXXXXX.XX YYYYYYY.YY ETX CD
Pump#=fueling position (2 characters)
Hose#=hose number (1 character)
Flag=totals type
vvvvvvv.VV=volume totals
XXXXXXX.XX=credit totals
YYYYYYY.YY=cash totals
Totals type flag:
'0'=totals not available for pump
'1'=pump busy try later
'2'=money totals only
'3'=cash & credit totals The PRICE PER UNIT COMMAND is used to read or set the price per unit on the fueling position. With this command, the controller can be configured. A price must be sent to hose number one if the fueling position exists. If multiple hoses are sent prices, the fueling position is considered to be an multi-product dispenser.
Command format:
STX J Pump# Hose# Flag XXX.XXX YYY.YYY ETX CD
Pump#=fueling position (2 characters)
Hose#=hose number (1 character)
Flag=operation type
XXX.XX=credit price
YYY.YY=cash price
Operation flag:
R=read operation
W=write operation
Response:
Write operation:
ACK/NAK only
Read operation:
STX pump# Hose# XXX.XXX YYY.YYY ETX CD
Pump#=Fueling position
Hose#=hose number
XXX.XXX=credit price
YYY.YYY=cash price The communication protocol is neither computer or operating system specific; DOS, UNIX, WINDOWS, and other operating systems can be used. Reference is made to U.S. Pat. No. 5,270,943 for an discussion of a DOS driver. The driver controls the flow of information between the controller (45) and the computer (55).

Figure 3:
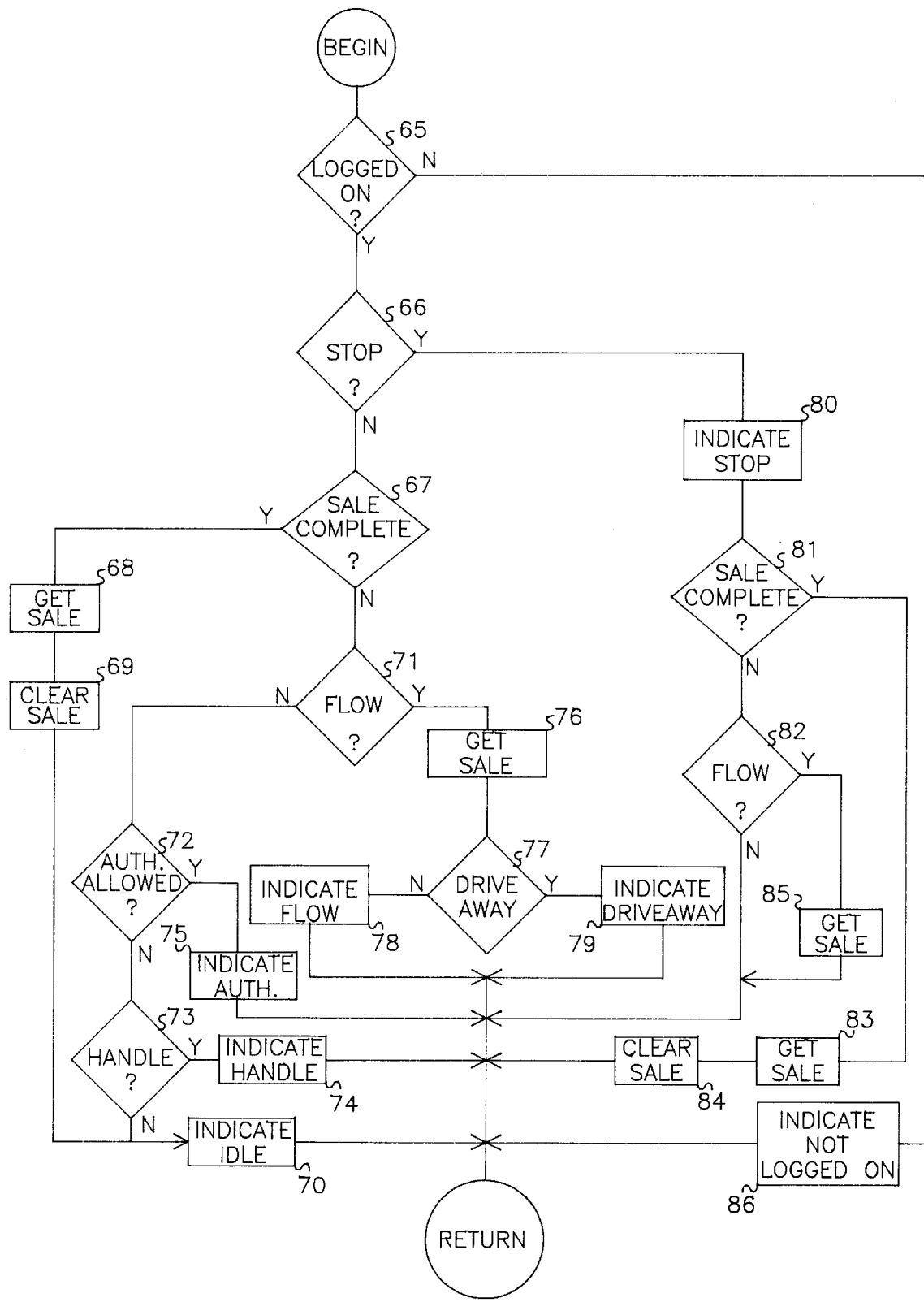
FIG. 3 is a program flow chart illustrating the flow of information between the pump controller and the POS computer for checking status of the pump.

The controller (45) is programmed to repetitively poll the pump for status and to update its database with resulting responses. Referring now to FIG. 3, there is shown a program flow chart illustrating how the MP (56) in the computer (55) interfaces to the MP (47) in the controller (45) to constantly determine status in the pumps. First, there is a LOGGED ON decision block (65) to determine if the controller is logged on; if not an INDICATE NOT LOGGED ON (86) is returned. If logged on, a STOP decision block (66) determines if the pump is in a stop state. If the pump is running, a SALE COMPLETE decision block (67) determines if the sale is complete. If the sale is complete, it GETS SALE (68), CLEARS SALE (69), INDICATES IDLE (70) which is returned. Referring back to SALE COMPLETE decision block (67), an incomplete sale signal causes FLOW decision block (71) to determine if there is flow. When there is no flow, an AUTHORIZE ALLOWED decision block (72) determines if an authorization has been allowed. If positive an INDICATE AUTHORIZATION (75) is returned; if negative, a HANDLE decision block (73) determines if a handle has been lifted. If not, an INDICATE IDLE (70) is returned, if a handle has been lifted, a INDICATE HANDLE (74) is returned.

Looking back to the FLOW decision block (71), a positive flow causes the system to check for a drive away (a situation where a handle is lifted but there has been no flow for seven seconds) through DRIVE AWAY decision block (77). The system GETS SALE (76), and determines flow. If DRIVE AWAY decision block (77) is negative, it INDICATES FLOW (78) and returns; if positive it INDICATES DRIVE AWAY (79) in the return.

Referring back to the STOP decision block (66), a positive stop signal causes an INDICATE STOP (80) to be sent to SALE COMPLETE decision block (81) to determine if the sale is complete. If the sale is complete, it GETS SALE (83) and CLEARS SALE (84). If the SALE COMPLETE decision block (81) is negative, the FLOW block (82) checks for flow. If there is flow, it GETS SALE (85) and returns. If there is no flow, it indicates this in the return.

U.S. Pat. No. 5,394,336 entitled Fuel Dispenser-Cash Register Control Console and U.S. Pat. No. 5,663,887 entitled Dispenser Control Console Interfaced To A Register, both having common inventors and assignee, are incorporated as references to the present disclosure. These disclosures relate to a control console which simultaneously controls fuel dispensers and a cash register. When a fueling transaction is paid out on the console, sales information is down-loaded to the cash register. The disclosures include a communication protocol translator for configuring the command logic signals from the MP in the console into a communication protocol readable by the fuel dispensers, and the responses from the dispensers into logic signals readable by the MP in the console. The disclosures disclose and claim a communication protocol translator for electronic, or "smart" pumps; they do not disclose a configurator means for mechanical pumps.

The controller (45) and the mechanical pump configurator (35) disclosed in the present application can be used in combination with the above described console to control mechanical pumps. Referring again to FIG. 2, there is shown a PIE port (51) on control board (45) for connecting to peripheral devices including above referenced console. The connection between the console and the controller is a serial connection. Commands are initiated from the input keys on the console and response data is returned to the console from the pump controller (45).

The present invention may, of coarse, be carried out in ways other than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A fuel delivery system, comprising:
   (a) at least one mechanical fuel pump means for delivering a variable volumetric flow of fuel into a vehicle tank;
   (b) at least one electronic fuel pump means for delivering a variable volumetric flow of fuel into a vehicle tank;
   (c) a computer means, functionally connected to said mechanical pump means and said electronic pump means, for initiating commands to said mechanical pump means and said electronic pump means and for receiving response data from said mechanical pump means and said electronic pump means;
   (d) a fuel pump control means having a programmable data processor with a read-only-memory device for storing operating code and a read-and-write-memory device for calculating and storing response data, operatively connected between said mechanical pump means and said electronic pump means and said computer means, for
      (1) retrieving commands from said read-only-memory device in a predetermined sequence and outputting said commands in a readable format to said mechanical pump means and said electronic pump means causing fuel to be dispensed;
      (2) receiving response data from said mechanical pump means and said electronic pump means during the fueling process and storing said response data in said read-and-write-memory device;
      (3) retrieving said response data from said read-and-write memory device and down-loading to said computer means on request;
   (d) a first configuration means operatively connected to said mechanical pump means and to said fuel pump control means for conditioning output signals from said pump control means to said mechanical pump means including an authorize signal and a valve signal and conditioning input signals from said mechanical pump means to said fuel pump control means including a pulse signal, a handle signal and a motor return signal;
   (e) a relay means connected between said first configuration means and said mechanical pump means including a first contact relay to receive said authorize signal and a second contact relay to receive said valve signal and processing circuits to process said pulse signal, said handle signal, and said motor return signal, for controlling said fuel pump means and sending response data to said first configuration means; and
   (d) a second configuration means operatively connected to said electronic pump means and to said fuel pump control means for conditioning output signals from said fuel pump control means to said electronic pump means and conditioning signals form said electronic pump means to said fuel pump control means.

2. A fuel delivery system as defined in claim 1, wherein said first mechanical configuration means includes an output driver means for conditioning said authorize and valve signals and an input conditioning circuit for conditioning said pulse, handle, and motor return signals.

3. A fuel pump control system for controlling the dispensing process in at least one mechanical fuel pump means for delivering a variable volumetric fuel flow and at least one electronic fuel pump means for delivering a variable volumetric fuel flow through a POS computer means having POS application software programming for initiating commands to said mechanical pump means and said electronic pump means, and receiving responses from said mechanical pump means and said electronic pump means, comprising:
   (a) a pump control means having a read-only-memory device for storing operating code and a read-and-write-memory device for calculating and storing response data, operatively connected between said fuel pump means and said POS computer means, for
      (1) retrieving commands from said read-only-memory device in a predetermined sequence and outputting said commands in a readable format to said fuel pump means causing fuel to be dispensed;
      (2) receiving response data from said fuel pump means during the fueling process and storing said response data in said read-and-write-memory device;

(3) retrieving said response data from said read-and-write-memory device and down-loading to said computer on request;

(b) a first configuration means operatively connected to said fuel pump control means and said mechanical pump means for conditioning output signals from said fuel pump control means including an authorize signal and a valve signal and conditioning input signals from said mechanical pump means including a pulser signal, a handle signal, and a motor return signal;

(c) a relay means connected to said mechanical pump means and said first configuration means including a first contact relay to receive said authorize signal and a second contact relay to receive said valve signal and processing circuits to process said pulse signal, said handle signal, and said motor return signal, for controlling said mechanical pump means and sending responses to said first configurator means;

(d) a second configuration means operatively connected to said electronic pump means and to said fuel pump control means for conditioning output signals from said fuel pump control means to said electronic pump means and conditioning signals from said electronic pump means to said fuel pump control means.

4. A method for controlling the dispensing process in at least one mechanical fuel pump and at least one electronic fuel pump through a PC-based POS means which initiates commands to said mechanical and electronic pumps and receives responses from said mechanical and electronic pumps, used in combination with a fuel pump controller means having a microprocessor with programmable memory devices for storing operating code to control said mechanical and electronic pumps and receiving response data from said mechanical and electronic pumps, a first configuration means for conditioning output signals from said fuel pump controller means to said mechanical pump and input signals from said mechanical pump to said pump controller means with a relay board means for processing said input and output signals, a second configuration means for conditioning output signals from said fuel pump controller means to said electronic pump and input signals from said electronic pump to said pump controller means, comprising the steps of:

(a) setting the price per unit of the fuel to be dispensed by sending a price per unit command from said POS means to said pump controller means formatted to include fueling position, read or write operation flag, and unit price for storage in said memory device in said pump controller means, and manually setting the unit price to be charged for the fuel in said mechanical pump;

(b) polling the status of said mechanical and electronic pumps by a status request command from said POS means through said pump controller means formatted to include fueling position, wherein said mechanical and electronic pumps respond with a status indicator response including pump is idle, pump handle has been lifted and service is requested, or pump is dispensing fuel;

(c) authorizing said mechanical and electronic pumps in response to a handle signal with an authorization command from said POS means through said pump controller means formatted to include fueling position and limit amount of fuel to be dispensed; and (d) reading the sales information by a sales information command from said POS means to said pump controller means formatted to include fueling position and operational flag, wherein with a read operation flag said fuel pump responds including pump number and amount of fuel dispensed, or with a clear operation flag the sale flag is cleared.

5. A fuel delivery system having a plurality of different spaced apart POS locations which are networked together, where each POS location in the network may or may not include a different type dispenser from any one or more of the other POS locations, comprising:

(a) dispenser means for delivering a variable flow of fuel into a vehicle tank;

(b) POS means including a computer means, functionally connected to said dispenser means, for initiating commands to said dispenser means and receiving response data from said dispenser means;

(c) a fuel pump control means having a programmable data processor with read-only-memory device for storing operating code and a read-and-write-memory device for calculating and storing response data, operatively connected between said dispenser means and said computer means, for
  (1) retrieving commands from said read-only-memory device in a predetermined sequence and outputting said commands in a readable format to said dispenser means causing fuel to be dispensed;
  (2) Receiving response data from said dispenser means during the fueling process and storing said response data in said read-and-write-memory device;
  (3) retrieving said response data from said read-and-write memory device and down-loading to said computer means on request;

(d) configuration means operatively connected between said dispenser means and said fuel pump control means for conditioning output signals from said fuel pump control means to said dispenser means and conditioning input signals from said dispenser means to said fuel pump control means; and (e) network means operatively connecting said computer means in said POS means for transmitting and receiving said response data between said spaced apart POS locations.

6. A fuel delivery system as recited in claim 5, wherein said dispenser means includes electronic dispensers.

7. A fuel delivery system as recited in claim 5, wherein said dispenser means includes mechanical dispensers.

* * * * *